Sept. 30, 1947. A. E. SWINDLER 2,428,184
DATE PICKING APPARATUS
Filed July 17, 1945 2 Sheets-Sheet 1
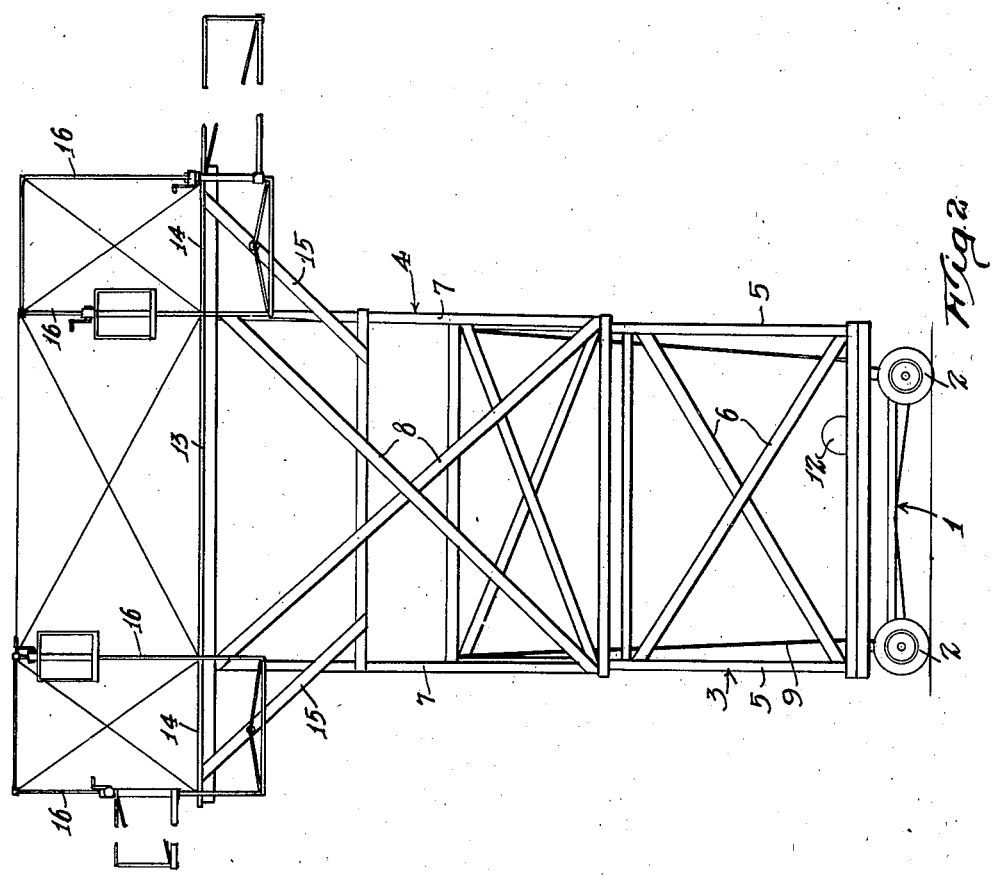
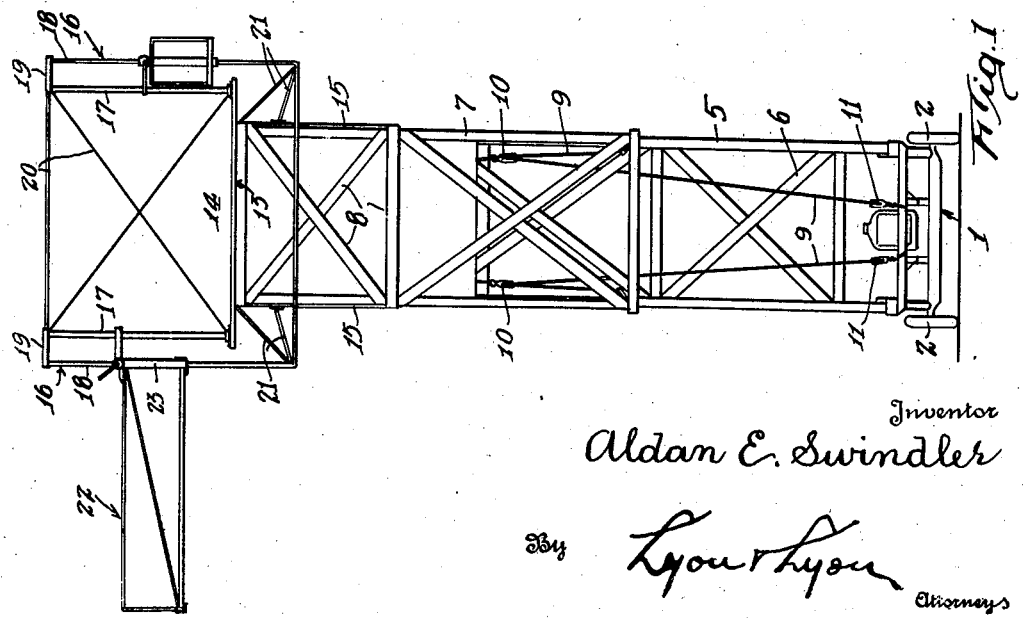
Inventor
Aldan E. Swindler
By Lyon & Lyon
Attorneys Sept. 30, 1947.  A. E. SWINDLER  2,428,184
DATE PICKING APPARATUS
Filed July 17, 1945  2 Sheets-Sheet 2
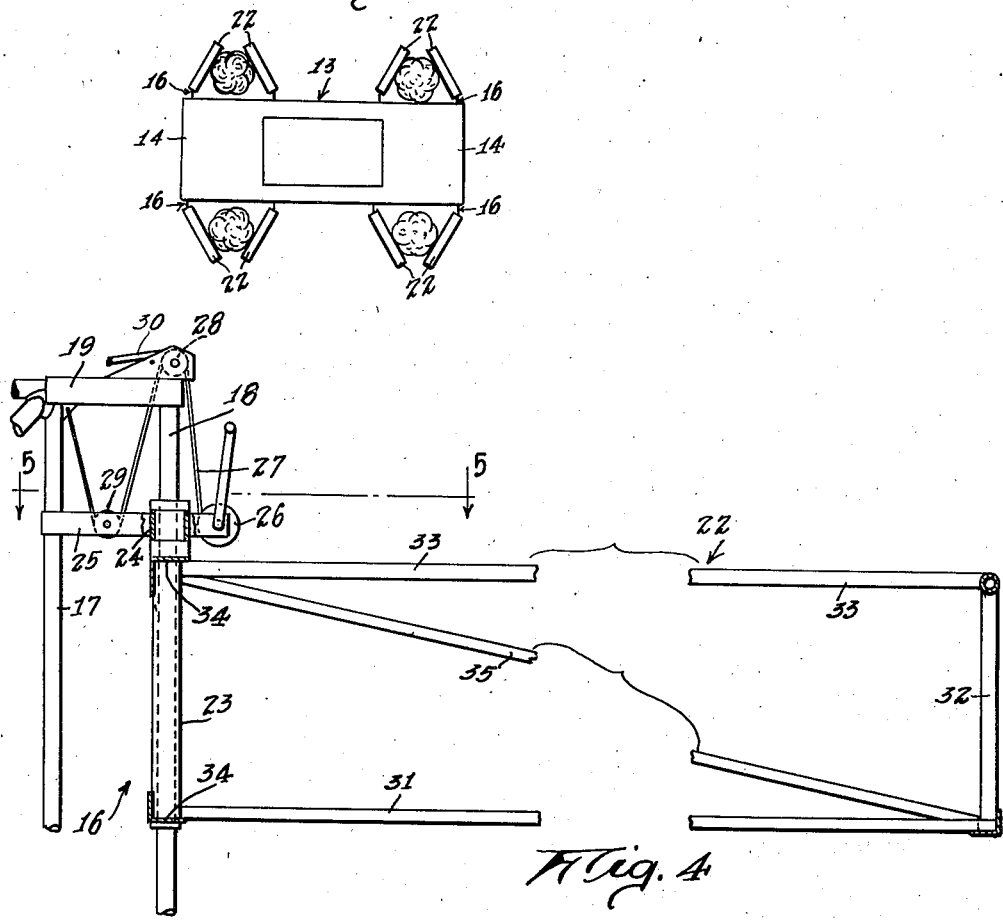
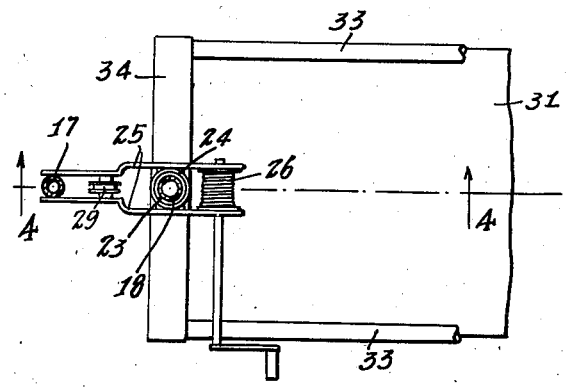
Inventor
Aldan E. Swindler
By Lyon & Lyon
Attorneys Patented Sept. 30, 1947

2,428,184

UNITED STATES PATENT OFFICE 2,428,184

DATE PICKING APPARATUS

Aldan E. Swindler, Indio, Calif., assignor of one-half to Leonhardt Swingle

Application July 17, 1945, Serial No. 605,565

7 Claims. (Cl. 304—9)

My invention relates to date picking apparatus, and among the objects of my invention are:

First, to provide an apparatus of this character which carries a plurality of individually adjustable booms or catwalks adapted to be raised and lowered, as well as extended in various directions between date trees or other fruit trees to place a crew in accessible relation to the fruit in order to pick the same, or otherwise treat or effect pollenization of the fruit.

Second, to provide an apparatus wherein the booms or catwalks are not only individually adjustable, but are also mounted on a common elevator structure so that the booms may be raised and lowered as a unit to approximate position and the booms adjusted individually.

Third, to provide an apparatus of this character, which is mounted on a self-propelled vehicle and which is adapted to service several trees at one time.

Fourth, to provide an apparatus of this character, which materially reduces the need of ladders or fixed scaffolding, thereby reducing the labor and time lost in re-locating, climbing and descending such structures, as well as the attendant risk of injury.

With the above and other objects in view as may appear hereinafter, reference is directed to the accompanying drawings, in which:

Fig. 1 is a front view of my date picking apparatus, with one boom directed laterally and another boom directed forwardly.

Fig. 2 is a side elevational view thereof, showing some booms directed laterally and other booms directed endwise.

Fig. 3 is a diagrammatical plan view showing the manner in which my date picking apparatus is arranged when employed to facilitate the picking or servicing of date trees.

Fig. 4 is an enlarged fragmentary sectional view through 4—4 of Fig. 5, showing one of the booms.

Fig. 5 is a fragmentary partial sectional, partial elevational view taken through 5—5 of Fig. 4.

My date picking apparatus is mounted on a chassis 1 which is preferably a reinforced truck chassis in which the axles have been extended laterally to increase the width of the wheel base. The chassis is supported on wheels 2. The chassis is equipped with a motor for driving all or the rear wheels, and steering means is provided. These items being conventional, are not shown.

The chassis 1 supports the lower of a pair of telescoping box frames 3 and 4. The box frame 3 includes uprights 5 defining the corners of a rectangle and connected together by cross bracing 6 so as to form a rigid though light weight structure. The box frame 4 is similarly formed but its uprights 7 are preferably L-shaped in cross-section so as to fit over the uprights 5, and are guided thereby. The box frame 4 is provided with cross bracing 8.

The box frame 4 is raised and lowered by means of cables 9 which are attached to the lower corners of the box frame 4 and pass upwardly over pulleys 10 attached to the upper extremity of the box frame 3, then downwardly and through pulleys 11 attached to the chassis frame 1 and then extend to a hoist 12. By this means the box frame 4 may be raised by operating the hoist 12 and lowered by gravity.

The box frame 4 supports a platform 13 which projects laterally a short distance beyond the sides of the box frame, and extends forwardly and rearwardly a greater distance to form end extensions 14. The end extensions are reinforced by braces 15 sloping downwardly to the box frame 4.

The platform 13 is provided with a series of boom supports 16. These supports are preferably arranged one at each corner of the platform and one above each corner of the telescoping box frame 4. Thus each end of the platform is provided with a group of four boom supports. Each boom support 16 includes an inboard strut 17 fastened to the platform 13, and an outboard strut 18, each disposed parallel with its mating inboard strut and extending clear of the platform to a point slightly below the platform. The inboard and outboard struts are tied together by cross members 19, and the inboard struts are joined together by suitable cross bracing 20. The lower extremities of the outboard struts are held by bracket frames 21 extending from the box frame 4 and the braces 15.

Each boom support 16 carries a boom 22. Each boom includes a sleeve 23 slidable on a corresponding outboard strut 18. Each sleeve 23 is provided with a journal 24 secured between a pair of guide bars 25 which extend on opposite sides of the outboard and inboard struts. The guide bars 25 of each boom carry a hand winch 26 which is provided with a suitable handle. A cable 27 is wrapped on the hand winch and passes upwardly over a pulley 28 mounted on the cross member 19 that passes downwardly over a second pulley 29 journaled between the guide bars 25 and between the struts 17 and 18. The free extremity of the cable 27 is anchored to the upper end of the outboard strut adjacent the cross member 19. The winch or one of the pulleys is provided with a suitable means for locking the cable in any adjusted position, for example, a latch device 30 may be provided on the pulley 28.

Each boom comprises a catwalk 31 extending outwardly from the sleeve 23. The far end of the catwalk is provided with posts 32 which are joined by rails 33 which in turn are joined to the sleeve 23 through suitable cross arms 34. Diagonal braces 35 extend from the supported to the outboard end of each boom.

Operation of my date picking apparatus is as follows: The date picking apparatus is moved into position with the telescoping box frames 3 and 4 collapsed, and the various booms folded inwardly against the sides or ends of the platform. When in position between for example, four trees, the box frame 4 and platform are elevated to approximately the desired height, and the booms 22 are extended between the various trees and individually adjusted. Two booms and the side of the platform itself are employed to service each tree. The booms converge so that all sides of the tree can be reached with one setting of the apparatus. As the packing or servicing of the fruit proceeds, the individual booms may be adjusted as needed without disturbing the others.

Many other embodiments of the invention may be resorted to without departing from the spirit of the invention.

I claim:

1. A date picking apparatus, comprising: a carriage structure including wheels and a chassis; telescoping tower frames carried by said carriage structure; means for extending and retracting said tower frames; a platform carried by the upper of said tower frames; a plurality of walkway booms disposed in pairs extending laterally from each side of said platform, each pair of booms adapted to embrace a date tree; and means for adjusting individually the heights of said walkway booms relative to said platform, said means being accessible to and operable by a person standing on the corresponding walkway boom.

2. A date picking apparatus, comprising: a carriage structure; a platform carried thereby; means for raising and lowering said platform with respect to said carriage structure; a plurality of walkway booms disposed in pairs extending laterally from each side of said platform for vertical movement in unison as said platform is raised and lowered, each pair of booms adapted to embrace a date tree; and means for adjusting individually the heights of said booms relative to said platform, said means being accessible to and operable by a person standing on the corresponding walkway boom.

3. A date picking apparatus, comprising: a carriage structure including wheels and a chassis; telescoping tower frames carried by said carriage structure; means for extending and retracting said tower frames; a platform carried by the upper of said tower frames; a plurality of boom support units grouped near and at each extremity of said platform; a boom pivotally and vertically adjustable on each of said supports, said booms adapted to project laterally from said platform at various angles and each including a walkway; and means for individually raising and lowering said booms relative to said platform.

4. A date picking apparatus, comprising: a carriage structure; a platform carried thereby; means for raising and lowering said platform with respect to said carriage structure; a plurality of boom support units grouped near and at each extremity of said platform; a boom pivotally and vertically adjustable on each of said supports, said booms adapted to project laterally from said platform at various angles and each including a walkway; and means for individually raising and lowering said booms relative to said platform.

5. A date picking apparatus, comprising: a carriage structure including wheels and a chassis; telescoping tower frames carried by said carriage structure; means for extending and retracting said tower frames; a platform carried by the upper of said tower frames; a pair of boom supports disposed near each end of each side of said platform, each boom support including an inboard support and an outboard support and bracing holding said supports upright with respect to said platform, the outboard supports extending to points below said platform; booms including guides slidable on said outboard supports, a platform extending horizontally therefrom and bracing for said platform; and means for individually adjusting said booms between positions above to positions below the platform.

6. A date picking apparatus, comprising: a carriage structure; a platform carried thereby; means for raising and lowering said platform with respect to said carriage structure; a pair of boom supports disposed near each end of each side of said platform, each boom support including an inboard support and an outboard support and bracing holding said supports upright with respect to said platform, the outboard supports extending to points below said platform; booms including guides slidable on said outboard supports, a walkway platform extending horizontally therefrom and bracing for said platform; and means for individually adjusting said booms between positions above to positions below the platform, each of said means being accessible to and operable by a person standing on the corresponding boom platform.

7. A date picking apparatus, comprising: a carriage structure; a telescoping tower mounted thereon; a platform carried by said tower and projecting forwardly and rearwardly therefrom; a plurality of boom mountings disposed at the sides of the projecting portions of said platform and grouped in pairs; and a plurality of walkway booms individually journaled on and vertically adjustable on said mountings; and means accessible from each individual walkway boom for adjusting its height and angle relative to said platform said platform adapted, when raised and lowered, to move said walkway booms in unison.

ALDAN E. SWINDLER.

REFERENCES CITED

The following references are of record in the file of this patent:

UNITED STATES PATENTS

| Number | Name | Date |
|---|---|---|
| 45,095 | Vail | Nov. 15, 1864 |
| 911,981 | Holst | Feb. 9, 1904 |
| 1,127,369 | Nash | Feb. 2, 1915 |
| 1,362,944 | Kirby | Dec. 21, 1920 |
| 1,682,209 | Baker | Aug. 28, 1928 |
| 1,901,566 | Presbrey | Mar. 14, 1933 |
| 1,960,355 | Famini | May 29, 1934 |
| 2,384,939 | Lord | Sept. 18, 1945 |
| 2,386,881 | Phillips | Oct. 16, 1945 |
| 2,405,453 | Savage | Aug. 6, 1946 |